May 22, 1956  W. F. ALLER  2,746,159
GAUGING DEVICE FOR BEARINGS
Filed Jan. 3, 1951  4 Sheets-Sheet 1

INVENTOR.
W. F. Aller
BY Edward J. ...
atty

May 22, 1956 W. F. ALLER 2,746,159
GAUGING DEVICE FOR BEARINGS
Filed Jan. 3, 1951 4 Sheets-Sheet 2

INVENTOR
W. F. Aller
BY Edward J. Noé Jr.
atty

May 22, 1956 W. F. ALLER 2,746,159
GAUGING DEVICE FOR BEARINGS
Filed Jan. 3, 1951 4 Sheets-Sheet 3

INVENTOR
W. F. Aller
BY Edward T. Noig
atty

United States Patent Office 2,746,159
Patented May 22, 1956

2,746,159

GAUGING DEVICE FOR BEARINGS

Willis Fay Aller, Dayton, Ohio, assignor to The Sheffield Corporation, Dayton, Ohio, a corporation of Ohio Application January 3, 1951, Serial No. 204,203

11 Claims. (Cl. 33—174)

This invention relates to gauging devices for gauging the radial clearance relationship of a pair of cooperating inner and outer mating parts. More particularly the apparatus is for gauging the radial clearance existing in an antifriction bearing.

One object of the invention is the provision of a gauging apparatus for gauging radial clearance, in which a pair of movable elements are positioned respectively by the inner side of the inner part and the outer side of the outer part at a gauging zone at one side of the axes of the parts, with provision for successively taking up radial play at the gauging zone and at a location diametrically opposite the gauging zone.

Another object is the provision of gauging apparatus of the character mentioned in which an indicator is bodily movable with one of the part engaging elements and the operating member or plunger of the indicator constitutes the outer contacting element.

Another object is the provision of gauging apparatus of the character mentioned in which there is provision for convenient adjustment to accommodate cooperating parts of different diameters.

Another object is the provision of gauging apparatus having means for applying a radial force in opposite directions on the outer one of the parts, under the control of fluid pressure.

More concisely the invention in the embodiment herein illustrated discloses a support or frame having a supporting arbor for loosely receiving the inner part of a pair of cooperating mating parts, such as, for example the inner race of an antifriction bearing. An indicator holding slide is operable vertically on the support and its position is determined by a work contacting arm partially housed in the arbor and controlled by the inner surface of the inner race. The indicator, which is adjustably mounted on this holder to accommodate different bearing dimensions, has a spring pressed plunger arranged for yielding engagement with the outer side of the outer race and the relative positions of the work contacting elements determine the indication produced. Thus a measurement is obtained at a gauging zone of the distance across the bearing races when radial play is taken up at the gauging zone and when radial play is taken up at a point opposite the gauging zone whereby the radial play may be determined. The means by which force is applied on the outer bearing race to take up the radial play as above mentioned comprises fluid pressure operated slides one above and one below the gauging zone, each slide having a band or strap that can be brought into engagement with the outer race.

With the above and other objects in view as will be apparent from the following description, the appended claims and the accompanying drawing, reference is made to the drawings in which, Fig. 1 is a perspective view of a gauging device embodying the present invention;

Fig. 5 is a view of the control connections; and

Fig. 6 is a section on the line 6—6 of Fig. 3.

Figure 1:
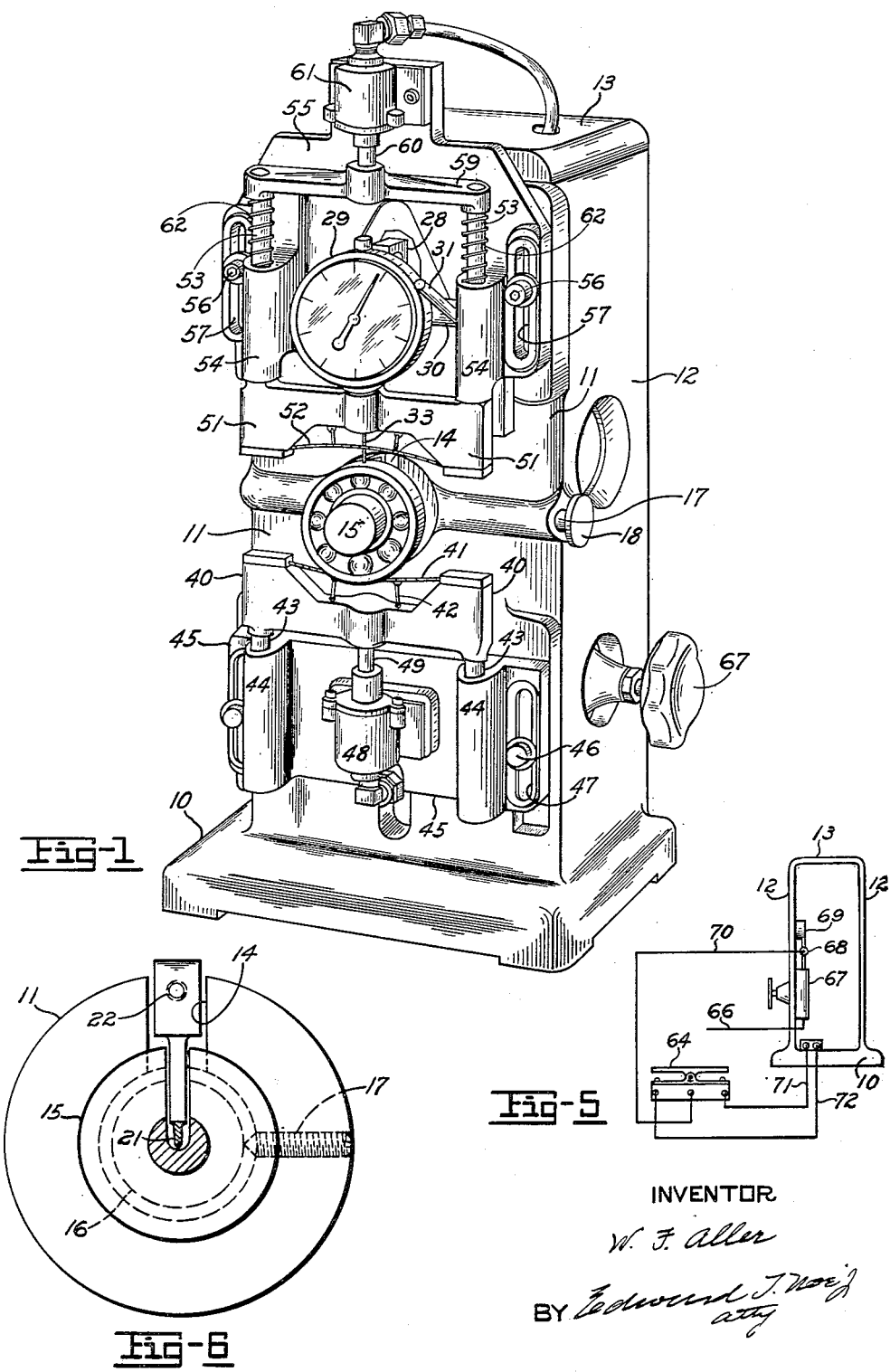
Figure 2:
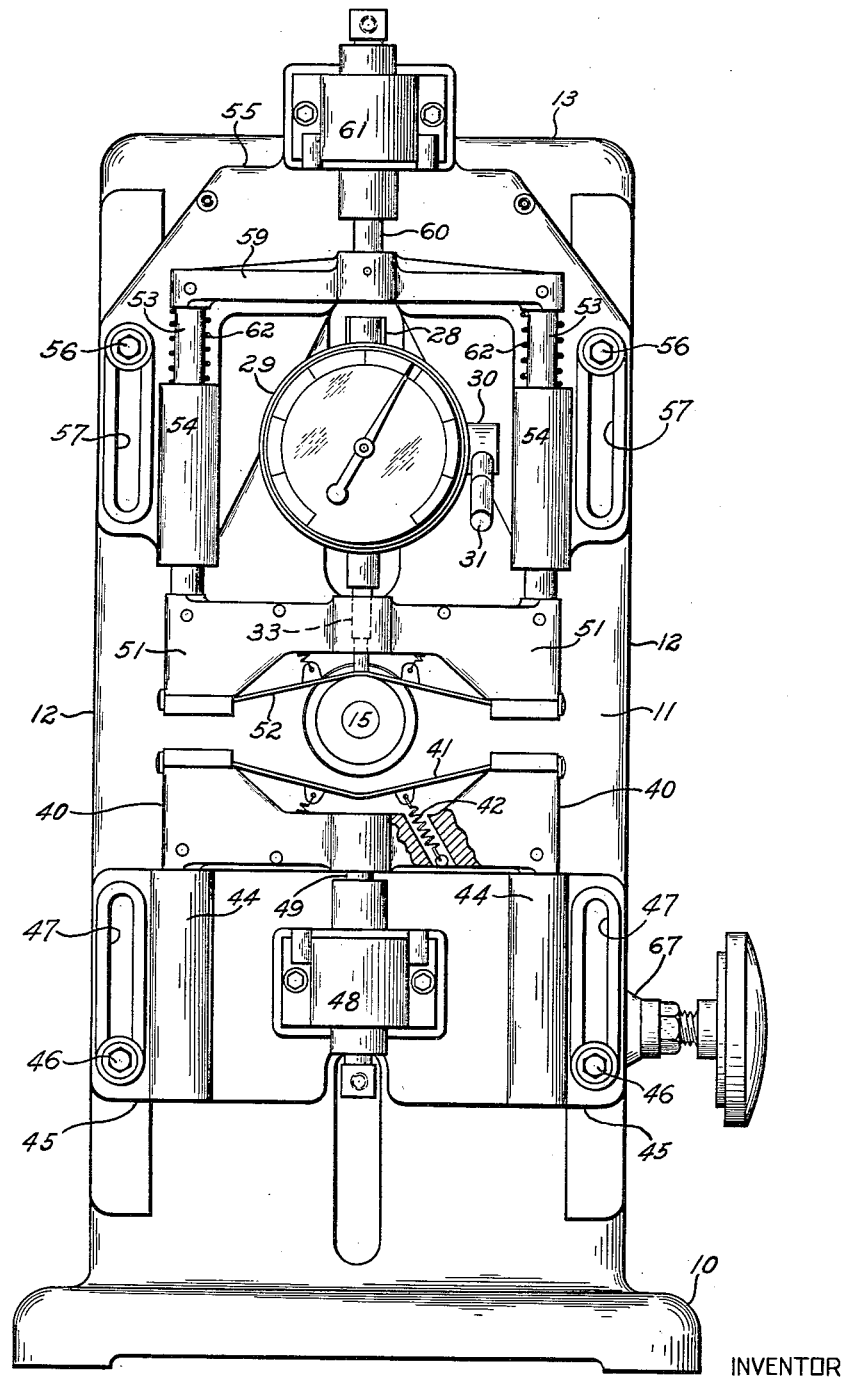
Fig. 2 is a front elevation of the gauging apparatus.

Referring more particularly to the drawing, 10 designates the frame or supporting casting of the gauging apparatus, providing a front wall 11, side walls 12 and a top wall 13. As will be apparent from Figs. 3 and 6, the front wall 11 has an opening 14 which removably receives the inner end of a work supporting arbor 15. The base portion of this arbor has an annular groove 16 into which the pointed end of a locking screw 17 is engaged. On the end of the screw 17 is a knob 18 so that by withdrawing the pointed end of the screw from the groove, the work supporting arbor can be removed for inspection or replacement.

The diameter of the work carrying portion of the arbor is slightly less than the minimum inside diameter of the inner bearing race to be gauged so that this race is telescopically received for limited slight radial play. A stop ring 20 fixed on the arbor locates this inner race in gauging position so that it is centrally arranged with respect to the work engaging portion of an element 21 shown as an arm partially housed in a longitudinal groove in the arbor with the rear portion of the arm extending upwardly and secured as by screw 22 to a movable holding plate 23. This plate is vertically slidable on the rear side of the front wall 11 preferably by means of antifriction bearing members 24 interposed between the sides of the plate and guide strips 25 which are secured to the rear side of the supporting front wall 11. The upper limit of travel of this plate 23 is determined by an adjustment screw 27 operated by a knurled knob 26, the screw being threaded in the upper wall of the support. Fixed to the plate 23 and projecting forwardly through a slot in the front wall 11 is an indicator carrying block 28 to which the back wall of a dial indicator 29 is secured as by means of an eccentric clamping shaft 30 operated by lever 31. By raising the lever the clamping engagement between the indicator and the block 28 is loosened and the indicator may be raised with respect to the block and then clamped in its raised position so that antifriction bearings of different diameter can be readily accommodated.

The dial indicator 29 includes the usual spring pressed plunger 33 the lower end of which constitutes a contact engaging element for contacting the outer side of the outer race. The spring in the indicator normally urges the plunger 33 downwardly and yieldingly against the outer race and operating mechanism of any suitable character is contained in the indicator for moving the indicating needle in accordance with the position of the plunger. As will now be apparent the two work contacting elements are both movable with respect to the arbor and to one another, the lower element 21 being depressed as the bearing is applied to the spindle and the upper element 33 being raised with respect to the indicator, the indicator itself being positioned by the lower element during gauging. It will thus be apparent that the indication produced by the indicator needle is not dependent upon the relative radial position of the inner race on the arbor and the radial play permitted between this race and the arbor creates no error. With the axis of the bearing parts horizontal the races centralize themselves in their planes of symmetry.

The lower work contacting element 21 together with the slide 23, block 28 and indicator 29 are normally held in an elevated position against the lower end of stop screw 27 and with the work engaging end of element 21 projecting up slightly from the adjacent portions of the arbor by means of a counter balance weight 35 connected by cable 36 which extends around guide roll 37 to a post 38 fixed to and projecting from slide 23. The weight of this counter weight is several ounces more than the weight of the slide 23 and the parts fixed to the slide so that a light constant gauging pressure is applied to the inner surface of the inner race. The spring contained within the indicator 29 is such as to apply only a light gauging pressure on the upper surface of the outer race.

In determining the radial play existing in any bearing gauged, the indication produced when all radial play is taken up at the gauging zone is compared with the indication obtained when all radial play is taken up at a point diametrically opposite the gauging zone. The provision for taking up radial play includes a pressure bar 40 having a flexible cable or strap 41 extending from one side of the bar to the other. Springs 42 are preferably connected to points near the center of the cable, the lower ends of these springs being anchored to the pressure bar. The cable is sufficiently flexible so it will conform to some extent to the curvature of the outer race when it engages the race, thus distributing the upward force over a substantial length of the outer race. The bar is guided by round posts 43 slidable in sleeve portions 44 of a guide plate 45 which is secured to the front wall 11 of the support by means of studs 46 threaded in the front wall and extending through vertical slots 47 in the plate 45. This arrangement permits upward or downward adjustment of the pressure bar 40 to accommodate bearings of different diameter. The plate 45 also supports a fluid pressure cylinder 48 having a piston rod 49 the upper end of which is fixed to the center of the pressure bar 40. When fluid pressure is applied to the lower side of the cylinder 48, the piston rod is raised and a predetermined force is applied by the cable 41 so as to press the outer bearing race upwardly and take up all clearance at a point opposite the gauging zone. When the fluid pressure is exhausted in the lower side of the cylinder 48, the weight of the pressure bar causes the downward withdrawal of the cable 41 so that it is released from the bearing race.

Figure 3:
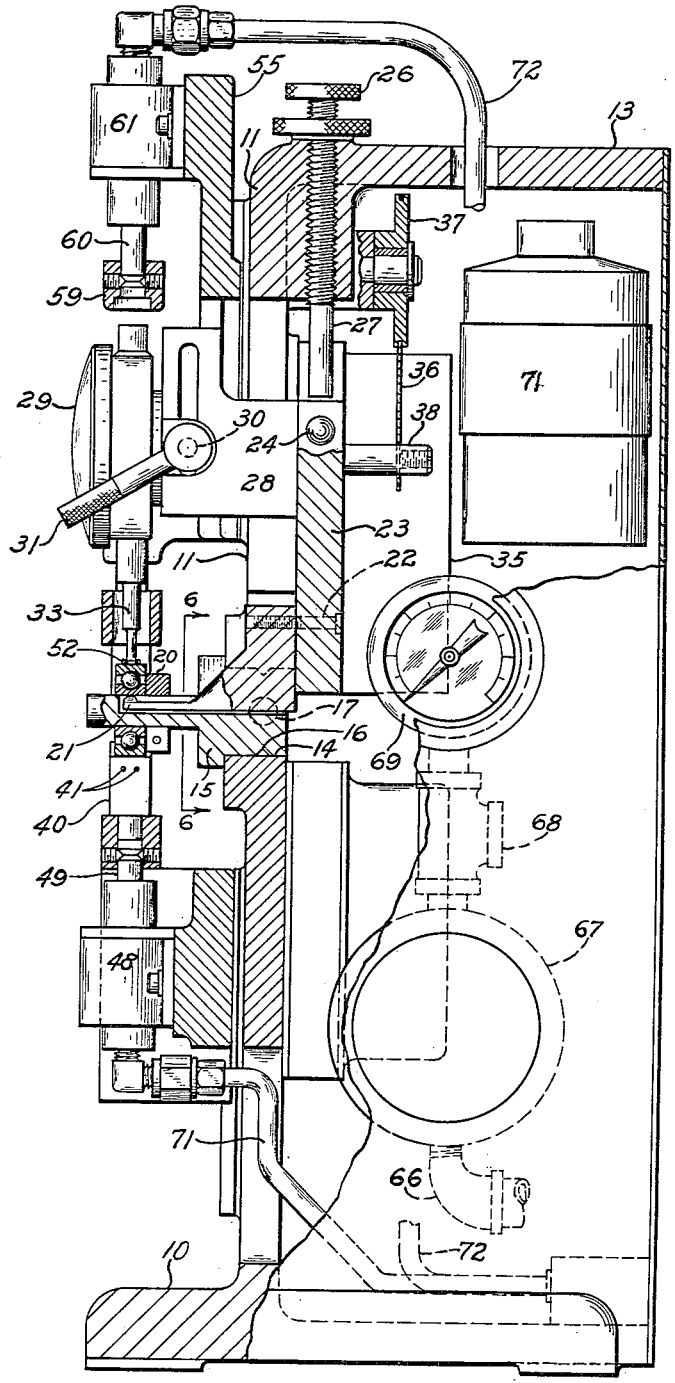
Fig. 3 is a side elevation partly in central vertical section.
Figure 4:
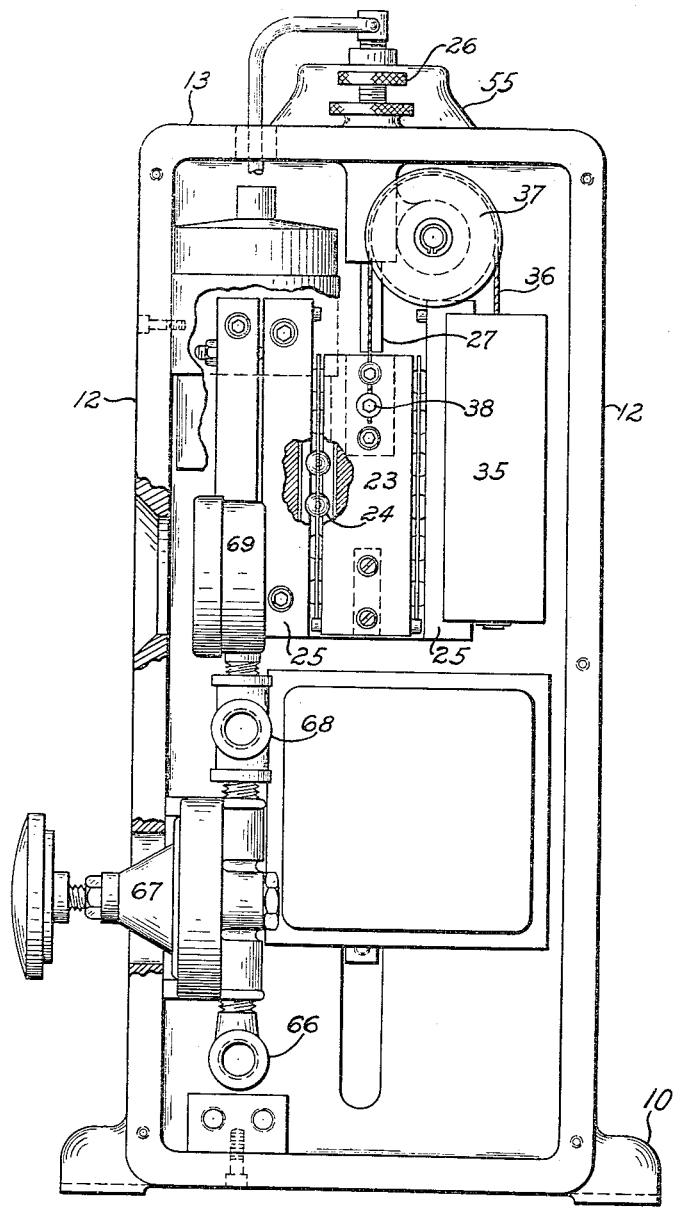
Fig. 4 is a rear elevation of the gauging apparatus, certain portions being illustrated in section.

There is a generally similar arrangement for applying a downward force on the outer race at the gauging zone. Thus as will be apparent from Fig. 1 the pressure bar 51 has a flexible cable 52 the central portion of which is double or divided as shown in Fig. 3 so as to extend around opposite sides of the plunger 33. Guide rods 53 fixed to this pressure bar operate in sleeve portion 54 of the slide 55 which is held in place by attaching screws 56 extending through slots 57 in the plate 55 and threaded in the front wall 11 of the support. This permits convenient upward or downward adjustment of the plate position to accommodate races of different diameters. The upper ends of the rods 53 are secured to an operating beam 59 which is centrally connected to the piston rod 60 of a fluid pressure cylinder 61. Springs 62 normally hold the pressure bar 51 in its elevated position. When fluid pressure is applied to the upper end of the cylinder 61 the pressure bar 51 is lowered against the action of the springs 62 and a predetermined force is applied downwardly on the upper side of the outer race so as to take up all radial play at the gauging zone itself. It will be understood that the pressure bars are moved to exert force centrally on the outer race in a consecutive manner, one being withdrawn as the other is applied. The force applied by the pressure bars may be of the order of ten pounds although considerably greater or lesser force than these may be used. Obviously the force applied downwardly by the bar 51 will add to the pressure applied by the gauging elements themselves in taking up play at the gauging zone, and the gauging elements will act in opposition to the force applied by the lower bar 40 when play is taken up at a point opposite the gauging zone but the actual force applied by the gauging elements is so small as compared with the force applied through the pressure bars as to produce no material error unless the bearing race is of thin or frail construction.

The control of the pressure bars is preferably accomplished by operating a foot treadle 64, see Fig. 5. Air coming from the factory air line or other suitable source is supplied through pipe 66 to a pressure regulator 67 preferably arranged in the support 10. A coupling 68 on the low pressure side of the pressure regulator is conneceted to pressure indicator 69 and a conduit 70 extending to the foot treadle. The foot treadle is adapted to be rocked so as to connect conduit 70 alternatively to pipes 71 and 72 but when the foot treadle is in a normal or natural position the conduit 70 is cut off and the pipes 71 and 72 are open to atmosphere since these pipes 71 and 72 extend to the pressure cylinders 48 and 61 respectively. When the foot treadle is rocked in either direction from its normal position it also closes an electrical circuit through a vibrator fixed to the gauge frame which mechanically vibrates the entire frame to aid in centralizing the balls in the races at the gauging time.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gauging the clearance relationship of a pair of inner and outer mating parts comprising a supporting member for loosely receiving one of the parts for limited radial play and free rotation thereon, a frame supporting said member in fixed position, means for applying a force in one direction radially on the other of said parts towards the said one part and including means for reversing the direction of force application, a first movable contact element within said supporting member for physically engaging the inner side of one of said parts and positioned thereby, a second movable contact element for physically engaging the outer side of the other of said parts, an indicator, a holder carrying the first of said elements and said indicator and operably mounted on said frame for rectilinear movement radially of said member, said indicator having indicating means controlled by the other of said elements, and means supporting the second of said elements for rectilinear movement parallel to the line of holder movement and with respect to said indicator.

2. Apparatus for gauging a bearing for radial clearance between the inner and outer races comprising an arbor for supporting one of the races and adapted to hold said race with its axis substantially horizontal and telescopically receiving said race for limited radial play thereon, means for applying predetermined force in a substantially vertical direction to the other race and means for reversing the direction of force application, a pair of movable race engaging elements on said frame for respective physical contact with said races, said arbor having a recess along one side thereof from which one of said elements extends for engagement with the inner side of the inner race, the other of said elements engaging the outer side of the outer race, a holder for said elements slidably supported for rectilinear movement radially of the bearing movable by one of said elements, and carrying the other of said elements for movement relative thereto along a line parallel to the direction of holder sliding, and means carried by said holder responsive to relative movement of said elements for gauging changes in the distance across the inner and outer races at one side of the bearing produced by changes in the direction of force application.

3. A gauging device for checking the clearance relationship of a pair of coaxial cooperating parts arranged one within the other comprising a support having a member for telescopically loosely receiving the inner part for limited free radial movement and for rotation thereon, means for applying a force directed radially on the outer part including means for reversing the direction of force application, a contact element in said member and extending beyond the member surface to physically engage the inner side of the inner part when such part is arranged on said member, an indicator, a holder carrying said contact element and indicator and slidably mounted on said support for movement radially of the parts, said indicator having a slidable plunger directly engaging said outer part and controlled thereby so that changes in the distance across the inner and outer parts at one side of the axis of said part caused by force reversal will be shown by the indicator, the construction being such that when the said parts are applied to the member said contact element is moved radially in such direction as to move the indicator towards the outer part, and counter-balancing means for counter-balancing the weight of the holder indicator and contact element to give a light pressure of the contact element on the inner part.

4. Apparatus for gauging the clearance relationship of a pair of coaxial cooperating parts arranged one within the other comprising a support having an arbor fixed thereon for loosely receiving the inner part for free limited radial play on the arbor, means for applying a force in one direction radially on the outer part including means for reversing the direction of force application, said arbor having a recess along one side thereof, a contact element within said recess and extending therebeyond for physically engaging the inner side of the inner part and positioned thereby, a second contact for physically engaging the outer side of the outer part, an indicator, a holder carrying one of said elements and said indicator and operably mounted on said support for movement radially of the parts in the direction of force application, said indicator having indicating means controlled by the other of said elements, means supporting the said other of said elements for relative movement with respect to the indicator along a line radial to the parts in response to displacements of the outer part, a counterbalance for said holder such that said one element is urged against one of the parts, and means for yieldingly urging the other element against the other part.

5. Apparatus as set forth in claim 4 including a slide adjustment for positioning said indicator on said holder at different distances from the axis of said parts.

6. Apparatus for gauging the radial play between the inner and outer races of an assembled ball bearing comprising a support, an arbor for telescopically receiving the inner bearing race for free limited play relative thereto, means detachably fixing said arbor to said support, means carried by said support for applying a force directed radially against the outer surface of the outer bearing race and including means for reversing the direction of force application, a holder, means mounting said holder on said support for sliding movement along a line radial to the axis of said arbor and parallel to the line of force application, a first contact element within said arbor projecting beyond the surface thereof and into engagement with the inner surface of the inner race, means attaching said first contact element to said holder, means cooperating between said support and said holder biasing said first contact element into engagement with the inner surface of the inner bearing race whereby the holder is correspondingly positioned, a second contact element for engaging the outer surface of the outer bearing race at a point opposing the contact point of the first contact element, plunger means slidable on said holder and carrying said second contact element at one end thereof, and gauging means cooperating between said plunger and said holder responsive to changes in the distance between the inner and outer bearing races at one side of the axis of said arbor caused by the reversal in the application of the force to the outer bearing race and the radial play of the bearing.

7. Apparatus for gauging the radial play between the inner and outer races of an assembled ball bearing comprising a support having a substantially horizontally extending arbor fixed thereon for telescopically receiving the inner race with limited radial play relative thereto, means carried by said support for selectively applying a predetermined force in a substantially vertical direction to the outer race including means for reversing the direction of force application, a holder carried on said support for vertical sliding movements along a line radial to said arbor, a first contact element carried in said arbor and extending above the upper surface thereof for engagement with the inner surface of an inner bearing race, means fixedly attaching said first contact element to said holder, means attached to said holder biasing said holder upward whereby said first contact element is maintained in engagement with the inner surface of the inner bearing race and the holder is positioned thereby, gauging means, said gauging means comprising a body fixed to and positioned by said holder and a plunger carried in said body for vertically sliding movement along a line radial to said arbor, said plunger having a second contact element at the lower end thereof for engagement with the outer surface of the outer bearing race in opposed relationship to said first contact element, whereby changes in the distance across the inner and outer bearing races at one side of the axis of said bearing along the line of force application will determine the relative positions of the gauging means body and plunger.

8. Apparatus for gauging the radial play between the inner and outer races of an assembled ball bearing comprising a support having a substantially horizontally extending arbor fixed thereon for telescopically receiving the inner race with limited radial play relative thereto, means carried by said support for selectively applying a predetermined force in a substantially vertical direction to the outer race including means for reversing the direction of force application, a holder carried on said support for vertical sliding movements along a line radial to said arbor, a first contact element carried in said arbor and extending above the upper surface thereof for engagement with the inner surface of an inner bearing race, means fixedly attaching said first contact element to said holder, means attached to said holder biasing said holder upward whereby said first contact element is maintained in engagement with the inner surface of the inner bearing race and the holder is positioned thereby, a dial indicator, the dial indicator body being attached to the slidable holder and the indicator plunger extending vertically therebelow along a line radial to the bearing supporting arbor, means cooperating between said holder and the indicator body for adjustably positioning said indicator on said holder in a vertical direction, said plunger having a second contact element at the lower end thereof for engagement with the outer surface of the outer bearing race in opposed relationship to said first contact element, whereby changes in the distance across the inner and outer bearing races at one side of the axis of said bearing along the line of force application will determine the relative positions of the gauging means body and plunger.

9. Apparatus for gauging the radial play between the inner and outer races of an assembled ball bearing comprising a support having a substantially horizontally extending arbor fixed thereon for telescopically receiving the inner race with limited radial play relative thereto, means carried by said support for selectively applying a predetermined force in a substantially vertical direction to the outer race including means for reversing the direction of force application, a holder carried on said support for vertical sliding movements along a line radial to said arbor, a first contact element carried in said arbor and extending above the upper surface thereof for engagement with the inner surface of an inner bearing race, means fixedly attaching said first contact element to said holder, means attached to said holder biasing said holder upward whereby said first contact element is maintained in engagement with the inner surface of the inner bearing race and the holder is positioned thereby, adjustable means threaded into said support and positioned for engagement by said slidable holder to limit upward movement thereof under the influence of said biasing means, gauging means, said gauging means comprising a body fixed to and positioned by said holder and a plunger carried in said body for vertical sliding movement along a line radial to said arbor, said plunger having a second contact element at the lower end thereof for engagement with the outer surface of the outer bearing race in opposed relationship to said first contact element, whereby changes in the distance across the inner and outer bearing races at one side of the axis of said bearing along the line of force application will determine the relative positions of the gauging means body and plunger.

10. Apparatus for gauging the radial play between the inner and outer races of an assembled ball bearing comprising a support having a substantially horizontally extending arbor fixed thereon for telescopically receiving the inner race with limited radial play relative thereto, means carried by said support for selectively applying a predetermined force in a substantially vertical direction to the outer race including means for reversing the direction of force application, a holder carried on said support for vertical sliding movements along a line radial to said arbor, a first contact element carried in said arbor and extending above the upper surface thereof for engagement with the inner surface of an inner bearing race, means fixedly attaching said first contact element to said holder, means attached to said holder biasing said holder upward whereby said first contact element is maintained in engagement with the inner surface of the inner bearing race and the holder is positioned thereby, gauging means, said gauging means comprising a body fixed to and positioned by said holder and a plunger carried in said body for vertical sliding movement along a line radial to said arbor, said plunger having a second contact element at the lower end thereof for engagement with the outer surface of the outer bearing race in opposed relationship to said first contact element, whereby changes in the distance across the inner and outer bearing races at one side of the axis of said bearing along the line of force application will determine the relative positions of the gauging means body and plunger, said force applying means comprising a pair of carriers, means adjustably mounting each of said carriers on the support for vertical movement toward and from the axis of the arbor, a movable force applying means slidably mounted on each of said carriers for vertical movement toward and from the outer surface of the outer bearing race, a fluid pressure cylinder mounted on the lowermost of said carriers and attached to the corresponding force applying means for raising the force applying means into engagement with the outer surface of the outer bearing race to apply an upward force thereon, resilient means on the upper carrier cooperating between the upper carrier and the upper force applying means biasing the force applying means upwards, a second fluid pressure cylinder mounted on the upper carrier and attached to the upper force applying means for moving it downward against the resilient means and into engagement with the outer surface of the outer bearing race for applying a downward force thereon, and means operatively connected to said fluid pressure cylinder for alternatively applying pressure thereto and reversing the direction of the applied force on the outer bearing race.

11. Apparatus for gauging the radial play between the inner and outer races of an assembled ball bearings comprising a support, a substantially horizontally extending arbor for telescopically receiving the inner race with limited radial play relative thereto, said arbor being inserted into said support, releasable attachment means cooperating between said support and arbor whereby the arbor can be readily removed and replaced for gauging different size ball bearings, means carried by said support for selectively applying a predetermined force in a substantially vertical direction to the outer race including means for reversing the direction of force application, a holder carried on said support for vertical sliding movements along a line radial to said arbor, a first contact element carried in said arbor and extending above the upper surface thereof for engagement with the inner surface of an inner bearing race, means fixedly attaching said first contact element to said holder, means attached to said holder biasing said holder upward whereby said first contact element is maintained in engagement with the inner surface of the inner bearing race and the holder is positioned thereby, gauging means, said gauging means comprising a body fixed to and positioned by said holder and a plunger carried in said body for vertical sliding movement along a line radial to said arbor, said plunger having a second contact element at the lower end thereof for engagement with the outer surface of the outer bearing race in opposed relationship to said first contact element, whereby changes in the distance across the inner and outer bearing races at one side of the axis of said bearing along the line of force application will determine the relative positions of the gauging means body and plunger.

References Cited in the file of this patent

UNITED STATES PATENTS

| | | |
|---|---|---|
| 1,204,027 | Johnson | Nov. 7, 1916 |
| 2,030,237 | Brittain | Feb. 11, 1936 |
| 2,080,941 | Hutchinson | May 18, 1937 |
| 2,370,220 | Aller | Feb. 27, 1945 |
| 2,419,280 | Weff | Apr. 22, 1947 |
| 2,420,711 | Look | May 20, 1947 |
| 2,448,106 | Mannerbrink | Aug. 31, 1948 |
| 2,525,068 | Ericson | Oct. 10, 1950 |
| 2,572,368 | Minix | Oct. 23, 1951 |
| 2,636,379 | Van Dorn | Apr. 28, 1953 |

FOREIGN PATENTS

| | | |
|---|---|---|
| 608,163 | Germany | Jan. 18, 1935 |